July 4, 1939.   D. O. LANDIS   2,164,747
MOUNT FOR SOUND REPRODUCING OPTICAL SYSTEMS
Filed Feb. 27, 1937
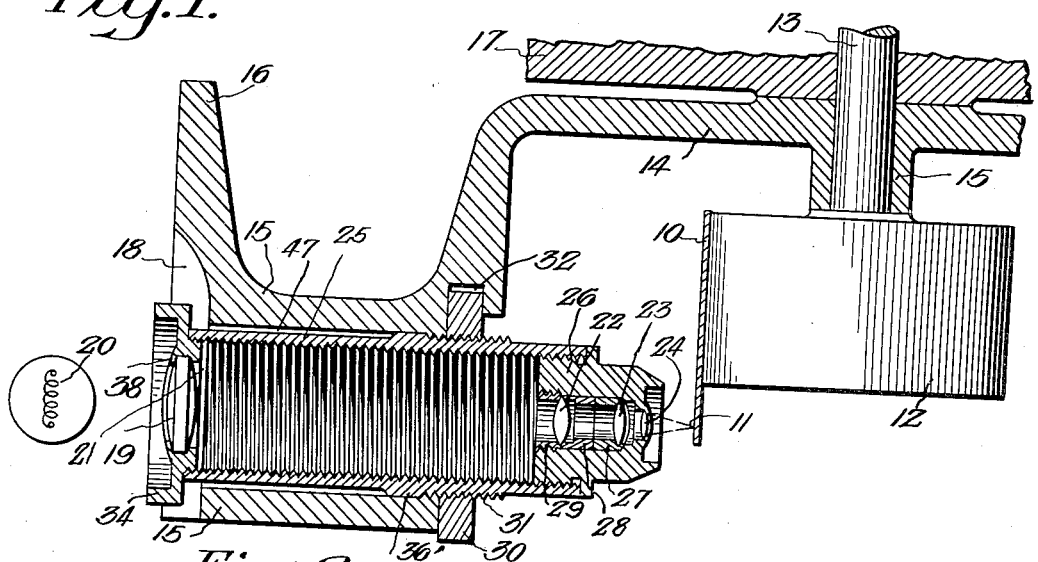
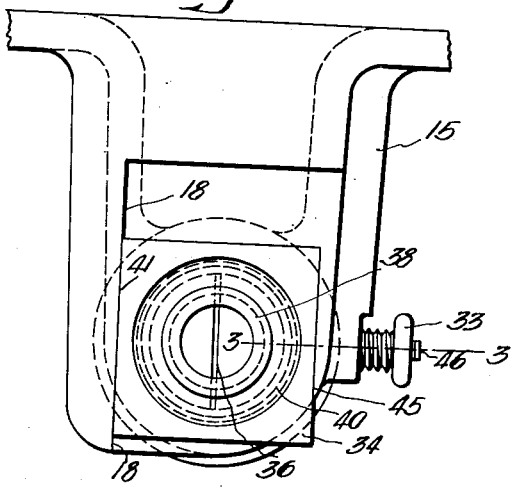
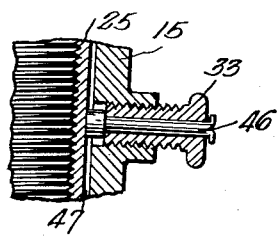
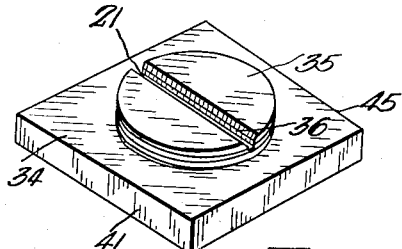
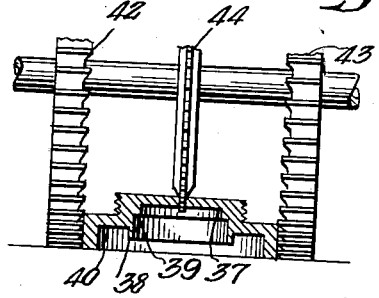
Inventor
Daniel O. Landis
By
Attorney Patented July 4, 1939

2,164,747

UNITED STATES PATENT OFFICE 2,164,747

MOUNT FOR SOUND REPRODUCING OPTICAL SYSTEMS

Daniel O. Landis, Upper Darby, Pa., assignor to Radio Corporation of America, a corporation of Delaware Application February 27, 1937, Serial No. 128,113

3 Claims. (Cl. 88—24)

This invention relates to a mount for optical systems which require adjustment in three directions, i. e., along the optical axis for focusing, laterally of the optical axis for image positioning, and rotationally about the optical axis for accurately determining the orientation of the image. Such optical systems find their greatest commercial importance at present in the type of devices used for producing the image of a slit upon a photophonographic film, and particularly in the reproduction of sound from such a film record.

In sound recording optical systems, it is usually desirable to have the optical system rotationally adjustable, as these devices are ordinarily used by highly skilled technicians who are able to accurately determine the adjustment thereof. However, in sound reproducing optical systems, such as are used in the ordinary soundhead for reproduction, the apparatus is placed in the hands of a relatively unskilled operator, who has no adequate facilities available for testing the alignment thereof. It therefore becomes necessary, in order to maintain the device in proper adjustment, to provide an optical system which is inherently as free from errors as possible, and which permits adjustment only for the purpose of focusing. Further, in the construction of such devices it is necessary to keep the construction cost relatively much lower than in sound recording apparatus, and manufacturing tolerances are, accordingly, made as large as possible. This, in turn, leads to inconvenience in locating the optical system with the necessary high degree of precision. The focal position of the optical system can be readily determined to within a very small fraction of an inch by the use of an output meter, but the rotational adjustment thereof is extremely difficult to determine, and must accordingly be inherently accurate in each of its parts in order that the total error shall not exceed approximately ¼ degree.

It has heretofore been proposed to make these reproducing optical systems readily adjustable, but these devices are mounted in a unit which is integral with a motion picture projector having an intermittent feed mechanism operating at a speed of approximately twenty-four pictures per second, and the vibration thereof tends to throw any such adjustable mechanism out of proper adjustment, while any adjustment is completely impossible during the operation of the device.

In an optical system made in accordance with my invention, I provide a relatively large rectangular member which determines the alignment of the slit with an index surface, and I make this rectangular member and its related slit in a single operation, without any resetting of the machine, and therefore with a minimum of error. The position of the remainder of the optical system is determined by this rectangular member insofar as it might deleteriously affect the image, and therefore the total injurious error which may occur in the manufacture of the system is limited to that occurring in the making of three simultaneous parallel cuts in a single operation of a machine tool.

One object of my invention is to provide an optical system mount which will always locate the optical system in a predetermined orientated position about the optical axis.

Another object of my invention is to provide an optical system mount which permits focal adjustment of the optical system while continuously maintaining it in predetermined orientation.

Another object of my invention is to provide an optical system mount which is inherently of a high degree of accuracy but will not require a corresponding degree of manufacturing precision.

Other and incidental objects of my invention will be apparent to those skilled in the art from a reading of the following specification and an inspection of the accompanying drawing, in which:

Figure 1 is a transverse section of my improved optical system mount, shown as applied to a commercial soundhead, Fig. 2 is an elevation from the left hand end of Fig. 1, Fig. 3 is a sectional view on the line 3—3 of Fig. 2, Fig. 4 is a perspective view of the slit block, and Fig. 5 is an end view, partly in section, showing the method of manufacturing the slit block.

Referring first to Fig. 1, a motion picture film 10, having a sound track thereon located adjacent the edge at 11, is fed through the apparatus over the drum 12, with the sound track portion of the film overhanging the edge of this drum. The drum is carried upon an appropriate shaft 13, and may be driven either by the film or by the shaft 13, according to the type of apparatus used.

The film 10 is, of course, fed circumferentially around the axis of the drum 12 and the shaft 13, and this axis provides the line from which the orientation of the optical system must be determined. The circumference of the shaft is, of course, the only reference surface available, and I accordingly bore the bearing holes for this shaft in the same setup as is used to align the slit, i. e., surface 18. This member 14 is a single casting including the body portion 15, which houses the optical system, the lug 16, and the locating surface 18 which rests upon the main casting 17 of the soundhead. The member 15 has a surface 18 milled therein as nearly in parallelism with the axis of the hole through which the shaft 13 passes as is practicable, and this milled surface establishes the reference plane from which the orientation of the optical system is determined.

The optical system itself includes a lens 19 which directs light from the exciter lamp 20 upon the slit 21, and the lenses 22, 23 and 24, which focus an image of the illuminated slit 21 upon the sound track portion 11 of the film 10.

This optical system is housed within a tube 25 which, as shown in the drawing, is internally threaded for its entire length and provides a support for the lenses. The internal threads, which are blackened, serve also to prevent the reflection of stray light from the walls of the tube.

The lenses 22, 23 and 24 are mounted within the member 26, which is preferably turned from a bar of appropriate material such as brass. The lens 24 may be spun into an appropriate seat in the member 26. The lenses 22 and 23, however, are seated in an axial bore in the member 26, the lens 23 being spaced from the lens 24 by an appropriate ring 27, and the lens 22 being spaced from the lens 23 by a second ring 28. A threaded ring 29 is screwed into the bore against the lens 22, and serves to hold the lenses 22 and 23, together with the spacers 27 and 28, firmly in position. Since these members are mounted directly on the optical axis of the system, their orientation is immaterial.

Focusing is accomplished by the ring 30, which cooperates with the screw threads 31 to move the optical system axially. This ring 30 is held from movement along the axis of the optical system by the slot 32, which is milled in the member 15 and in which the member 30 fits with a sliding fit. The tube 25 is held in adjusted position in the member 15 by the set screw 33, which is provided with a freely rotating member 46 intended to prevent the set screw from moving the optical system axially and disturbing the focusing adjustment when the set screw is rotated to clamp the tube in fixed position in relation to the member 15.

The tube 25 is relieved on its outer surface, as indicated at 47, and due to the pressure of the set screw 33, only the narrow shoulder 36' contacts with the member 15 on the side opposite the set screw 33, thus necessitating accuracy of diameter over but a small length of the tube. The slit block 34, shown in perspective in Fig. 4, is rectangular and is provided with a circular central portion 35 in which the slit 36 is cut. The portion 35 is threaded on its periphery to screw into the tube 25. The circular portion 35 is bored out internally, as indicated at 37 (Fig. 5), and is provided with threads or a raised edge 38 for spinning, as shown in Fig. 1, to retain the lens 19 against the seat 39. In order to produce the edge 38, the interior of the rectangular member is relieved as indicated at 40 (Figs. 2 and 5) or left solid if a screw mounting is used.

The edge 41 of the block 34, its opposed edge, and the slit 36 are formed at a single operation, preferably in a milling machine, in the manner indicated in Fig. 5. After the necessary counterbores have been made from the opposite side for location on a suitable pilot as indicated at 39 and 40, the block is appropriately fixed on the complete bed of the machine and passed between two cutters 42 and 43, which are mounted on a common shaft or spindle with the cutter 44. The cutters 42 and 43 face off the opposed edges of the blocks 41 and 45, and the cutter 44 simultaneously cuts the slit through the member 35 of the proper width. It will be apparent that, since this operation is performed through the simultaneous use of three coaxial cutters, and during a single movement of the carriage of the machine, the two outer surfaces of the slit will necessarily be in as exact alignment as the condition of the machine permits.

When the optical system is assembled and the surface 41 (or the surface 45) is brought into contact with the surface 18, which, as before described, is formed accurately parallel with the axis of the shaft 13, the slit 36 will necessarily be parallel to the axis of the shaft 13 to the degree of precision established by only two machine operations, i. e., the milling of the surface 18 parallel with the axis of the shaft, and the milling of the slit 36 parallel with the surfaces 41 and 45.

When the focus of the optical system is changed by means of a knurled nut 30, the face 41 of the member 34 moves along the optical axis on the surface 18. The set screw 33, and compression member 46 of course, maintains the surface 41 and the surface 18 intimately in contact when the device is focused, and this, with the contact of the collar 36 on the interior of the member 15, fixedly establishes the position of the optical system. Compression member 46 is free to rotate in screw 33 and is headed on the outside to prevent removal or loss.

Having now described my invention, I claim:

1. In apparatus of the class described, a lens tube, an objective mounted in one end of said lens tube and a slit block having a circular extension mounted in the other end of said lens tube, said slit block being rectangular and slightly larger than said tube and having a slit therein parallel with two sides of the rectangle whereby placing said slit block in contact with a flat surface will determine the orientation of said slit.

2. In apparatus of the class described, having a shaft carrying a film supporting drum, an optical system bracket having a hole therethrough adapted to fit said shaft, a second hole having its axis in the same plane with and at right angles to the axis of said first hole, said bracket being provided with a plane surface in a plane parallel to the plane defined by the axes of said holes for fixing the orientation of an optical system in said second hole.

3. In apparatus of the class described having a shaft carrying a film supporting drum, an optical system bracket having a hole therethrough adapted to fit said shaft, a second hole in said bracket having its axis in the same plane with and at right angles to the axis of said first hole, said bracket being provided with a plane surface in a plane parallel to the plane defined by the axes of said holes for fixing the orientation of an optical system in said second hole, and an optical system in said second hole, said optical system comprising a lens tube, an objective mounted in one end of said lens tube and a slit block mounted in the other end of said lens tube, said slit block being rectangular and slightly larger than said tube and having a slit therein parallel with two sides of the rectangle whereby placing one of said sides of said slit block in contact with said plane surface will fix the orientation of said slit in relation to said shaft.

DANIEL O. LANDIS.